March 21, 1939. H. W. MITCHELL 2,151,134
BRAKE TESTING DEVICE
Filed Feb. 17, 1936
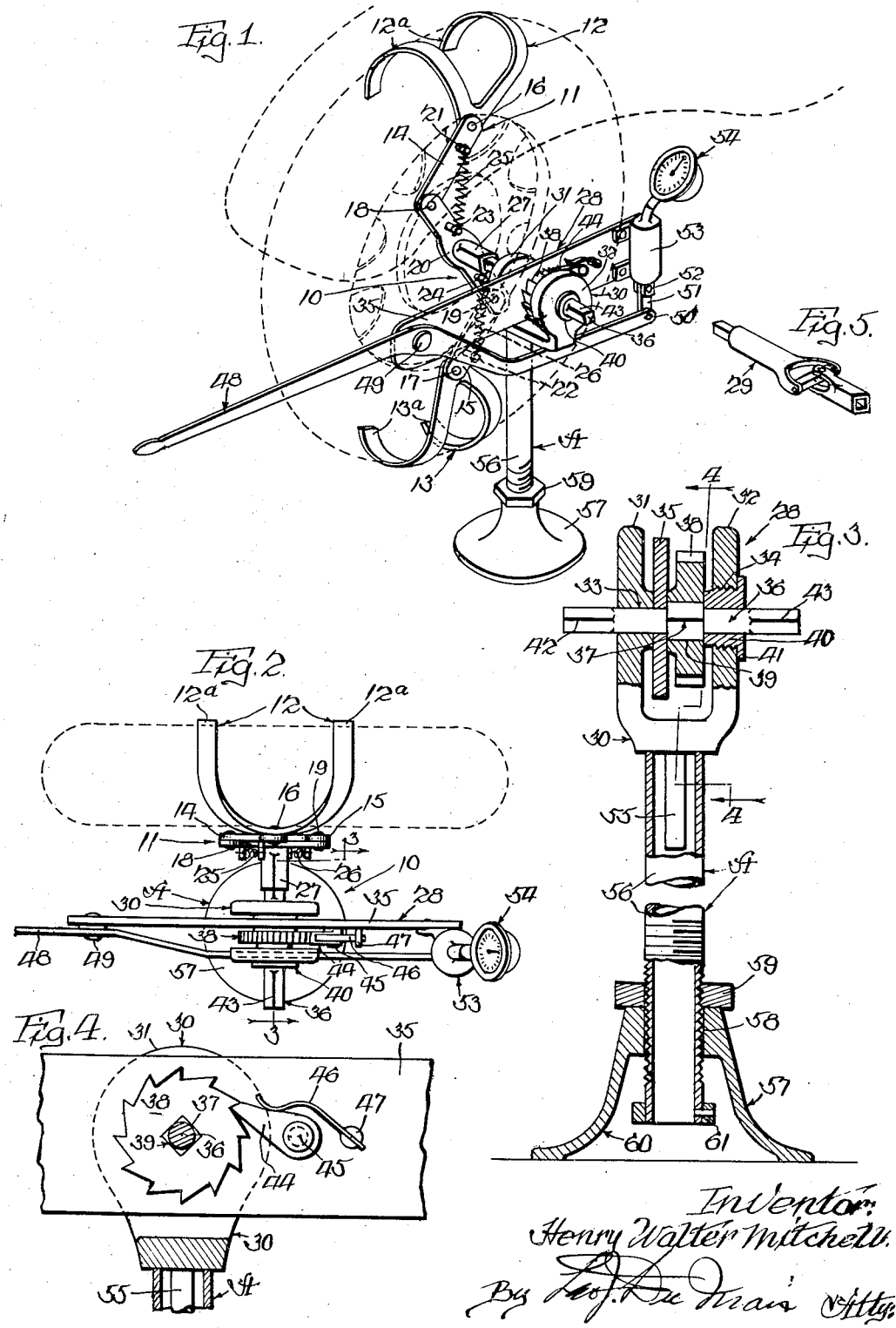
Inventor:
Henry Walter Mitchell Patented Mar. 21, 1939

2,151,134

UNITED STATES PATENT OFFICE 2,151,134

BRAKE TESTING DEVICE

Henry Walter Mitchell, Chicago, Ill., assignor to Emil A. Stromberg, Chicago, Ill.

Application February 17, 1936, Serial No. 64,216

6 Claims. (Cl. 265—1)

This invention relates to improvements in a brake testing device, and more particularly for ascertaining the relative force of brakes on different wheels of automobiles.

The invention comprises a device adapted to be easily and quickly applied to a wheel of an automobile which has been elevated from the floor, and the device when applied automatically positions itself axially thereto, and is provided with outwardly extending operable parts to manually apply a pressure thereon to urge the wheel for turning movements against a set brake.

The chief objects of the invention are the provision of a device that is simple in construction, strong and durable, inexpensive to manufacture, and which has relatively few working parts, arranged and constructed so as to be easily and readily applied to the wheel of an automobile for testing the relative force of the brakes on different wheels.

A further object is the provision of a brake testing device, which is easily and readily applied to the wheel and which, when applied, automatically positions itself centrally with respect to the axial center of the wheel, whereby the force applied to the device attached thereto, will be distributed to the periphery of the wheel.

A still further object is the provision of means for positioning the manually operable mechanism in spaced relation with the attachable means permitting the securing and operation of the device to the wheel of an automobile having full-skirted fenders.

And a still further object is the provision of a hydraulic indicator or gauge operatively connected with the manually operable mechanism of the device for registering the force applied for effecting the turning movements of the wheel against its brakes.

And a further object is the provision of an adjustable support coacting with the manually operable mechanism for supporting the same substantially axially with the wheel while attached to the attachable means secured thereto and while said wheel is elevated from the floor.

Referring to the drawing:

Figure 1 is a perspective view of my brake testing device, illustrated as applied to the wheel of an automobile.

Figure 2 is a top plan view of the device shown in Figure 1.

Figure 3 is an enlarged detail cross-sectional view of the manually operable mechanism, taken substantially on the line 3—3 of Figure 2 and illustrates the adjustable support therefor.

Figure 4 is an enlarged longitudinal partial sectional detail view taken substantially on the line 4—4 of Figure 3, illustrating the dog and ratchet means; and Figure 5 is a detail perspective view of a universal joint which may be positioned between the attachable means and the manually operable mechanism.

The device, when applied to the wheel of an automobile with its manually operable mechanism attached thereto, serves as a torque-applying device and is designated as a whole as 10.

The device comprises attachable means 11, which is adapted to be easily and readily applied to the tire of an automobile wheel and which comprises a pair of engageable members 12 and 13, that are in the shape of a U and have their free ends 12a and 13a respectively, curved to encircle the tread of a tire to form a grip thereon. Each of the engageable members 12 and 13 has a link 14 and 15 respectively, pivotally connected thereto at 16 and 17, and which links have their other ends pivotally connected at 18 and 19 to each end of a main link 20. The links 14 and 15 are each provided with an outwardly directed stud 21 and 22, and the main link 20 is provided with a pair of studs 23 and 24, which studs are arranged in pairs with the studs 21 and 22 of the links 14 and 15, and between each pair of studs a spring 25 and 26 respectively, is connected which serves to exert a tension to collapse the links 14 and 15 toward the main link 20 and draw the engageable members 12 and 13 toward each other. The main link 20 is provided with an outwardly directed socket 27, fixed intermediate its length and which serves to receive a manually operable mechanism 28 for exerting a turning pressure to the wheel.

With this construction of attachable means 11, it will be noted that the main link 20 and the links 14 and 15 serve as a toggle and as the manually operable mechanism 28 is attached thereto, these links will readily adjust themselves to the position in which they are urged, the springs 26 and 25 permitting of their adjustments. The springs 26 and 25 exert a normal tension on the engageable members 12 and 13 and may be easily applied to the tire of a wheel by merely separating these engageable members against the tension of their springs 26 and 25 until the curved formations 12a and 13a thereof surround the tire and when released, the springs will urge them to snugly grip the periphery and retain the attachable means in fixed relation thereon with the socket member 27 on the main link 20 substantially axially with the wheel. The engageable members 12 and 13 are curved to accommodate for different sizes of tires and are arranged to be yieldingly attached thereto without adjusting the same. The engageable members are positioned approximately diametrically on the tire and the springs urge the main link 20 across the axial center of the wheel. The socket 27 extends outwardly of the main link 20 and may be of a length suitable to sufficiently space the manually operable mechanism that is adapted to be attached thereto, to permit the use of the device for testing the brakes of the wheels of automobiles having full-skirted fenders.

The manually operable mechanism comprises the unit 28 which is normally adapted to be supported on a stand A, and which may be directly attached to the attachable means 11 or spaced a greater distance therefrom by means of a universal joint 29 positioned between the attachable means and the manually operable means.

The operating mechanism 28 comprises a bifurcated head member 30 which forms a pair of upwardly directed portions 31 and 32 respectively, with the portion 31 provided with a transverse bore 33 and the portion 32 provided with an enlarged aligned transverse threaded bore 34. A rockable member 35 is pivotally carried for rocking movements adjacent the portion 31 of the head member 30 on a shaft 36 which is provided with a squared shoulder 37 on which a ratchet-wheel 38, having a corresponding squared opening 39 therein, is secured. A threaded bushing 40 provided with an annular flange 41 is threaded into the threaded bore 34 and serves to retain the rockable member 35 and the ratchet-wheel 38 in position between the portions 31 and 32 of the bifurcated head member 30. The shaft 36 extends outwardly of the portions 31 and 32 on both sides of the bifurcated head member 30 and is provided with squared ends 42 and 43 respectively, either of which are adapted to be positioned within the socket 27 to connect the manually operable mechanism with the attachable means.

The rockable member 35 carries a dog 44 pivotally secured thereto on a pivot 45 and is normally urged in engagement with the ratchet-wheel 38 by means of a spring 46 fixed to a stud 47 on the rockable member 35.

The rockable member 35 has a lever 48 pivotally carried at one end thereof on a stud 49 and extends toward the free end of the rockable member 35 and is pivotally secured at 50 to an upwardly directed link 51, which is pivotally secured at 52 to an indicating device 53 that is preferably of the hydraulic type, and which is provided with an indicating head 54 for registering the movement of the lever 48 with respect to the rockable member 35 which registers the pressure applied to turn the wheel against a set brake. The indicating device 54 being secured to the rockable member 35.

As thus far described, it will be noted that the attachable means 11 is arranged to be readily applied to the tire of an automobile wheel after the same has been elevated from the floor, and the springs 26 and 25 thereon exert a tension for retaining the same in position. The manually operable mechanism 28 is then connected to the attachable means 11 and a pressure is applied to the lever 48 which is indicated on the indicating head 54.

To support the manually operable mechanism, the stand A is employed to which the bifurcated head 30 is attached. The head 30 is provided with an integral downwardly directed stud 55 that is adapted to extend into a tubular upright member 56 of the stand A which has a base 57 provided with a bore 58 into which the tubular member 56 is slidably carried and which is adjustably positioned therein by means of a nut 59, that is threaded to the member 56 and which rests on the base 57. The bore 58 terminates into an enlarged opening 60 into which the lower end of the tubular member 56 extends and which has a collar 61 fixed thereto, to limit its vertical adjustments on the base 57.

The stud 55 extends freely into the tubular member 56 and permits of a slight rocking action of the manually operable mechanism when in use, which acts as a universal joint to insure perfect alignment when testing the brakes.

The wheel of the automobile is elevated, so that its axial center is approximately aligned with the shaft 36 of the manually operable mechanism 28 and a closer adjustment for a perfect alignment is effected by adjusting the nut 59 which adjusts the vertical positioning of the tubular member 56 on the base 57.

To test the brakes, it is only necessary for the operator to exert a downward pressure upon the lever 48, which causes the rockable member 35 to rock on the shaft 36 and carry the dog 44 therewith and exert a turning movement on the ratchet-wheel 38 to turn the shaft 36 and the main link 20 therewith in a counter-clockwise direction, (Fig. 1), which effects a pulling strain on the links 14 and 15 and tends to increasingly draw the engageable members 12 and 13 inwardly to firmly grip the tire. Upon a greater movement of the lever 48 after the members 12 and 13 have firmly gripped the tire and while the brakes of the car are withholding the wheel from rotating movements, the lever 48 will force the link 51 upwardly and effect a movement of the hydraulic indicator 53 to indicate on the indicating head 54, the pressure exerted on the lever to turn the wheel.

Should the operator wish to vary the position of the lever 48 during the time the brakes are being tested, the dog 44 and the ratchet-wheel 38 will permit of an upward rocking movement of this lever 48 and the rockable member 35, on the shaft 36.

The squared portions 42 and 43 of the shaft 36 permit of the attaching of the operable mechanism 28 with the attachable means 11 when the same is positioned on the wheels of either side of the automobile without having to reverse the direction of the dog and ratchet-wheel.

The integral depending stud 55 of the bifurcated head 30 is arranged to loosely fit into the tubular member 56 of the support and permits of a slight rocking action of the manually operable mechanism 28 when connected to the attachable means and a pressure is applied thereto. This slight rocking action serves to align the manually operable mechanism with the axial center of the wheel and relieves the binding strain thereon, should the operator fail to properly adjust the support for alignment with the wheel.

The effect of the manually operable mechanism 28 when attached to the socket 27 of the attachable means 11, is to turn the main link 20 which exerts a pull on the links 14 and 15 and tends to increasingly clamp the engageable members 12 and 13 to firmly grip the tire of the wheel.

It will be noted that the springs 25 and 26 of the attachable means 11 permit of a swinging action of the links 14 and 15 when urged by the main link 20, so that the attachable means positioned on the tire of a wheel may readily adapt itself for turning the wheel in a clockwise or counter-clockwise direction without necessitating the removal of the attachable means from the wheel and will firmly grip the same while in either direction of its movement.

I claim:

1. A brake testing device of the character described, comprising link means adapted to be attached on the tire of an automobile wheel and having a main link adapted to extend across its axial center, actuating means associated with said main link means forming means for turning the main link for increasingly gripping the link means on the tire and for rotating the wheel against the action of its brake, said actuating means comprising a head member, a shaft extending through the head member, a rockable member, ratchet means coacting with the shaft and rockable member for turning the shaft in one direction, a lever on the rockable member, and indicating means between the lever and rockable member indicating the pressure applied to said lever for turning the wheel.

2. A brake testing device of the character described, comprising link means adapted to be attached to the tire of an automobile wheel and having a main link adapted to extend across its axial center, engageable means on said main link disposed substantially axially with the wheel, manually operable means adapted to be attached to said engageable means forming means for turning the main link to increasingly grip the link means on the tire and for rotating the wheel against the action of its brake, said manually operable means comprising a rockable member, a transverse shaft extending through the rockable member, ratchet means between the rockable member and shaft to turn the shaft in one direction of movement of the rockable member and to be free of said shaft in its other direction of movement.

3. A brake testing device of the character described, comprising link means adapted to be releasably attached to the tire of a wheel and having a main link thereof extending across the axial center of the wheel, manually manipulative means adapted to be attached to the main link forming means for turning the wheel against a set brake, said manually operable means comprising a head member, a shaft pivotally carried therein and extending outwardly on both sides thereof, a rockable member on the shaft, a ratchet-wheel secured to the shaft adjacent the rockable member, a spring-urged dog on the rockable member engaging said ratchet-wheel, an indicating device on the rockable member, and a lever pivotally carried on said rockable member and operatively connected to the indicating device, whereby a pressure in one direction on said lever will exert a strain on the indicating device to rock the rockable member and turn the ratchet-wheel and shaft to turn the link means and wheel against its brake.

4. A brake testing device adapted to be removably attached to the tire of an automobile wheel including a main link disposed diametrically of the wheel for rotating the same against the action of its brake, and actuating means attachable to the main link axially with said wheel, said actuating means comprising a rockable member having indicating means carried thereon and a lever pivotally connected to said rockable member and indicating means, and a support for said rockable member and lever supporting the same substantially axially with said wheel whereby the pressure exerted on said lever will be transmitted to the wheel and indicated on said indicating means.

5. A brake testing device comprising link means adapted to be removably attached to the tire of an automobile wheel and having a main link disposed diametrically of the wheel, actuating means adapted to be attached to said main link to rotate the wheel against the action of its brake, supporting means for said actuating means, and adjustable means on the supporting means for positioning the actuating means with respect to the axial center of the wheel to align and attach the same therewith whereby a rocking movement of the actuating means forms means for exerting a torque on said wheel, and means on the actuating means to measure the torque thus applied.

6. A brake testing device comprising link means adapted to be removably attached to an automobile wheel and having a main link thereof disposed diametrically of the wheel, actuating means adapted to be attached to said main link for rotating the same to cause said link means to increasingly grip the wheel and to rotate the wheel against the action of its brake, means supporting said actuating means, and means to measure the torque thus applied.

HENRY WALTER MITCHELL.